United States Patent Office

3,409,046
Patented Nov. 5, 1968

3,409,046
FLUID TRANSFER APPARATUS
Robert E. Means, Tacoma, Wash., assignor to Hooker Chemical Corporation, Niagara Falls, N.Y., a corporation of New York
Filed Nov. 30, 1964, Ser. No. 414,622
6 Claims. (Cl. 137—615)

ABSTRACT OF THE DISCLOSURE

The present invention relates to a cargo boom used for loading and unloading liquids from a ship. It is comprised of four pipes mounted parallel to a movable, supporting boom. The pipes are primarily rigid, but also have short sections of flexible tubing. The apparatus is constructed in a manner which permits freedom of movement during loading and unloading such as that experienced with changes in tide, and list of the ship and other movements associated with ships. In addition, the boom, which is normally located on board ship, is capable of rotating 120 degrees. Other features of the boom include hydraulic activation and microswitch relaxation of the hydraulic system.

---

This invention relates to a loading and unloading device for fluids. More particularly, it relates to cargo boom for the transfer of fluids from ship to shore.

Various marine loading and unloading devices for liquid cargoes are known. It has been known to employ heavy rubber hoses suspended from loading arms or hose handling rigs that were mounted on wharves or docks. Also, heavy self-supporting pipes and pipes suspended from cranes have been used for such operations. However, in the unloading of potentially hazardous liquids such as chlorine, no satisfactory device was previously known which incorporated desirable safety factors, maneuverability, flexibility and ease of handling. In addition, previous devices utilized separate suspending cranes or operating mechanisms for each line or hose connection.

It is an object of the present invention to provide a liquid transfer boom of the required flexibility, maneuverability and ease of handling so as to permit the loading and unloading of liquid cargo while allowing for normal movement of the vessel, such as movements due to changes of draft, tides, listing, rolling, pitch, and drift toward, from and along a dock. It is another object of this invention to provide a cargo boom for transporting fluids which reduces or eliminates stresses on the liquid conveying lines. It is a further object to provide a liquid cargo conveying device having a plurality of conveying members attached to and controlled by a single supporting member. Yet another object is to provide a cargo conveying system of economical design capable of handling high pressure fluids and requiring a minimum of equipment and facilities to which the conveying system is connected. A further object of this invention is to provide a cargo transfer device which is readily controlled by a single operator.

The above and other objects will become apparent to those skilled in the art from this specification and the drawings.

In accordance with this invention, an apparatus is provided for transferring fluids between two containers comprising a boom comprised of a king post to which is associated in operative relationship a supporting member, said supporting member being associated in operative relationship with a forearm; said boom having associated thereto a plurality of pipe assemblies comprising a king post pipe assembly, a supporting member pipe assembly and a forearm pipe assembly; said king post pipe assembly being maintained in operative relationship with said king post and being adapted for movement compensatory with the supporting member movement; said king post pipe assembly being linked to the supporting member pipe assembly retained by said supporting member, and said supporting member pipe assembly being linked to said forearm pipe assembly, the forearm pipe assembly being retained by the forearm; the king post, supporting member and forearm pipe assemblies being supported by said boom and being interconnected for fluid transmission.

The present invention has numerous features especially desired for the conveyance of hazardous fluids, both liquid and solid particles, under pressure. The boom is constructed so as to relieve the pipe members of structural stress created during loading and unloading due to movements of the ship. In this manner, the danger of rupturing transmission lines is greatly reduced or eliminated. The design of the present boom provides a safety in handling hazardous fluids that has not previously been accomplished in the loading and unloading of ships and the like vessels. In addition, a plurality of transmission lines are attached to a single boom thus reducing the equipment required in loading and unloading operations as well as permitting the loading or unloading of more than one type of fluid at a given time. Further, the plurality of pipes permits the unloading of more than one container at a given time using the same boom, as is often desired.

The term "hazardous fluids" refers to those liquids and solids which, if released to the atmosphere would create a danger to life or property. Such fluids are often classified as toxic, corrosive, explosive and the like. Although the present boom is particularly desirable for handling hazardous fluids, it is to be understood that the boom is also suitable for handling other than hazardous fluids.

The boom of the present invention is preferably mounted on board a ship, barge or like vessel, but can readily be mounted on a dock or wharf. In either instance, the attachments to which the boom is connected in loading and unloading operations are minimal. Thus, when mounted on board ship, the dock connections may consist only of lock-on, snap-on or flange pipe fittings.

The present liquid transfer boom is self-actuating, being capable of reaching from ship to pier under its own power. In the operation of the boom, a crew of one man operating the hydraulic console or boom controls and another performing the connecting functions are all that are required. Once connected, the liquid transfer boom is capable of sustained connection without constant surveillance. In this respect, the liquid transfer boom is capable of accommodating tide changes, changes in draft, list, fore and aft, drift, and the usual combinations of pitch and roll which are produced by ground swells. Such adjustments are made automatically without surveillance.

The invention will be more readily understood with reference to the drawings in which.

Figure 1:
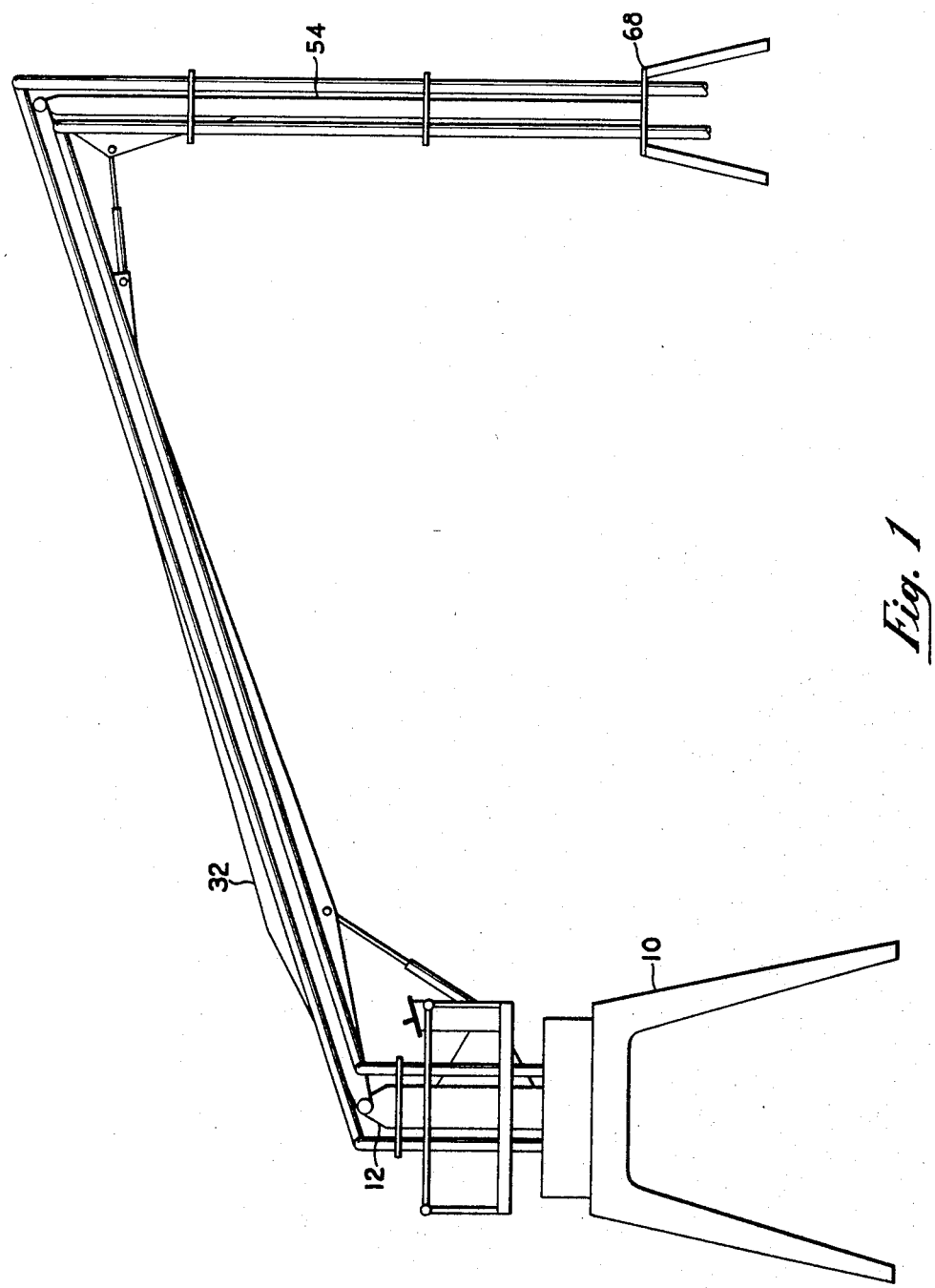
FIG. 1 is a side view of the apparatus of the present invention.
Figure 2:
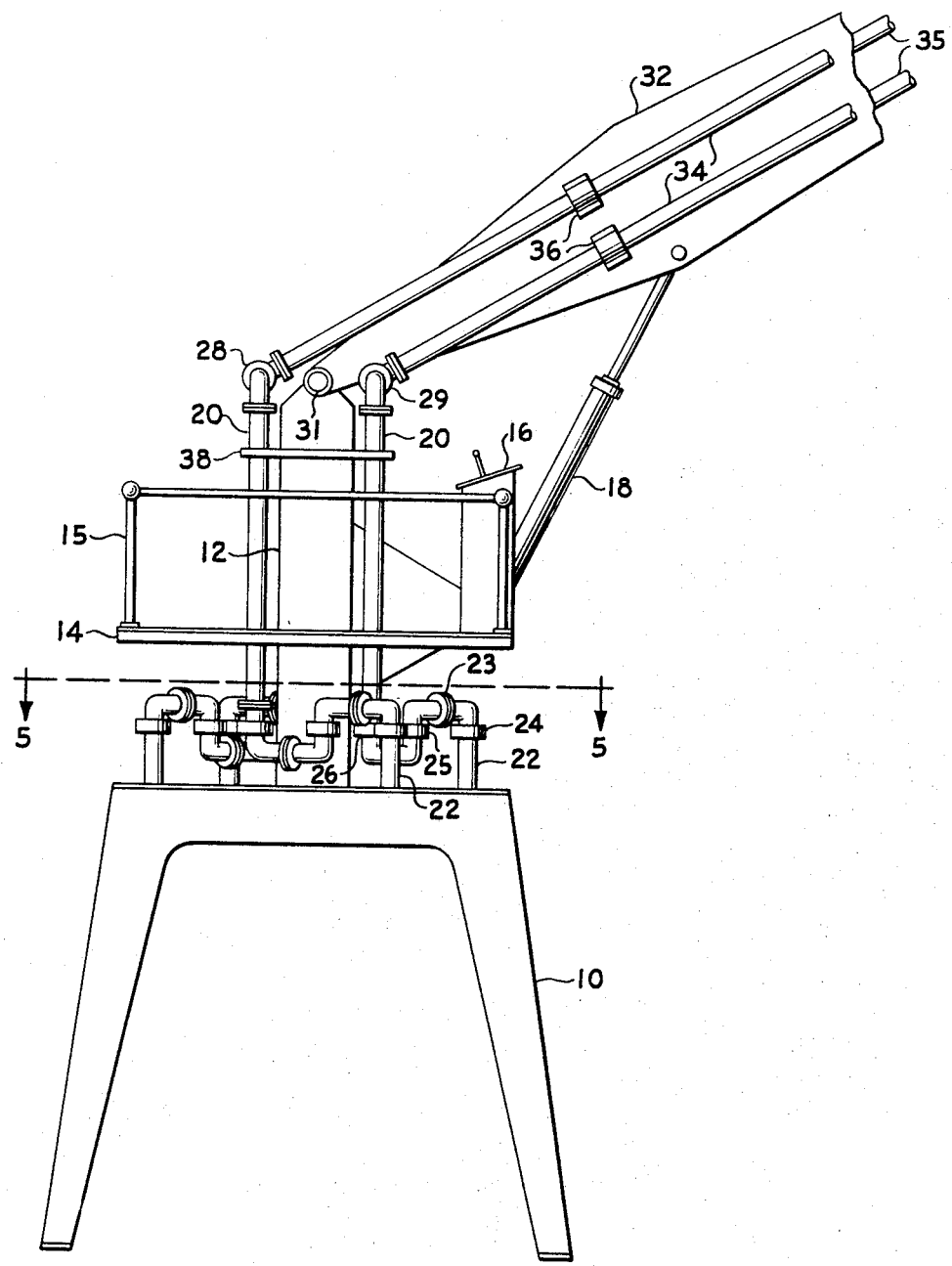
FIG. 2 is an enlarged, more detailed, partial elevation of the apparatus of the present invention.
Figure 3:
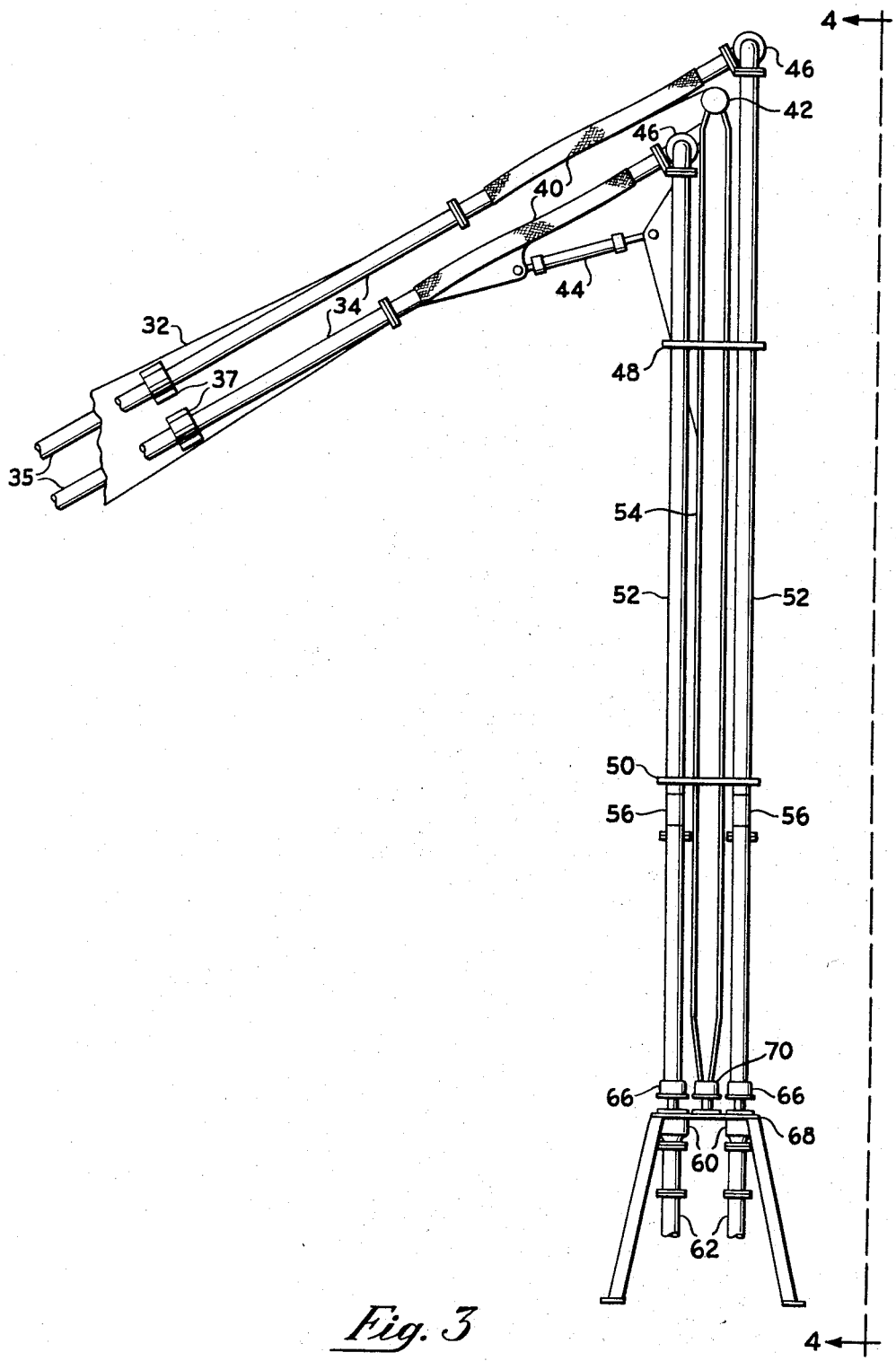
FIG. 3 is a continuation of the enlarged view of FIG. 2 showing the apparatus of the present invention.
Figure 4:
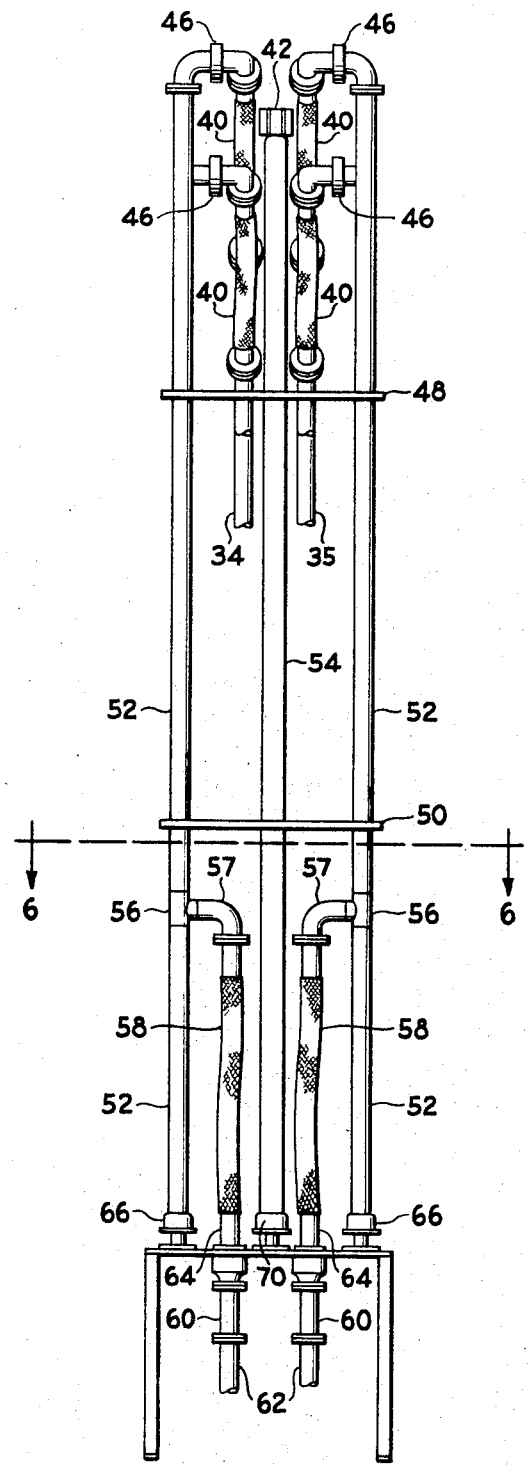
FIG. 4 is a front elevation of the apparatus along 4—4 of FIG. 3.
Figure 5:
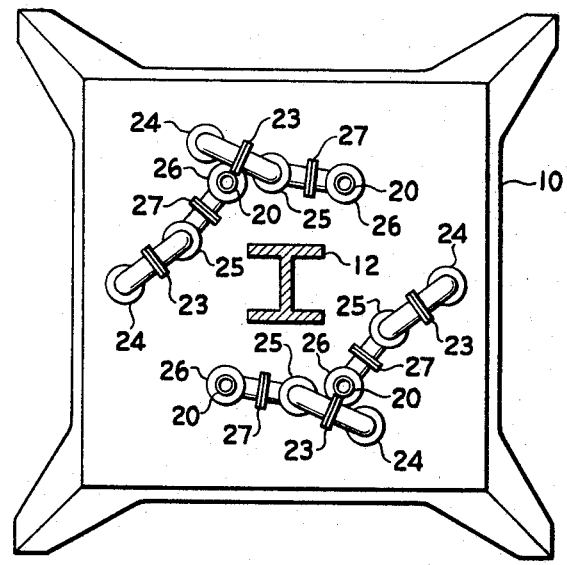
FIG. 5 is a plan view of the means providing compensatory movements of the king post pipe assembly with the king post along 5—5 of FIG. 2.
Figure 6:
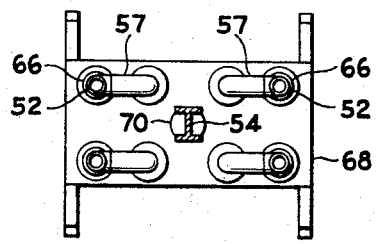
FIG. 6 is a sectional view of the forearm and forearm pipe assembly along 6—6 of FIG. 4.
Figure 7:
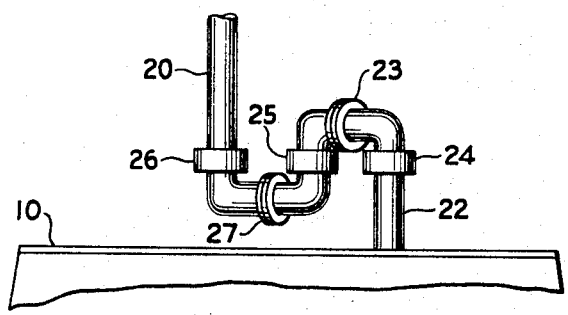
FIG. 7 is an enlarged view of a king post pipe as shown in FIG. 2 and the means which provide the pipes of king post pipe assembly with movements compensatory with the rotation of the king post and supporting member movements.

The apparatus of the present invention as illustrated in the drawings, comprises a king post support 10, king post 12, forearm 54, supporting member 32, forearm connection plate 68. The king post support 10 is a four-legged structure normally mounted on board ship. Its function is to hold the king post 12 in a normally vertical position and to dissipate all lateral and vertical loads resulting from the weight of the various boom members, piping and fluids therein.

King post 12 is supported on king post support 10 by rollers which accommodate bidirectional loads. Surrounding king post 12 is an operating platform 14 and guardrail 15. Located on the operating platform 14 is hydraulic control console 16 by which the operation of the boom is controlled.

Rotation of king post 12 so as to change the direction of the boom is effected by hydraulic cylinders located under platform 14. King post 12 rotates about its vertical axis 120 degrees, thus permitting the accommodation of drift, fore and aft during loading and unloading operations, in addition to providing a stowing position when not in use. King post 12 is normally positioned substantially perpendicularly to platform 14 but if desired, it can be angled in a position other than vertical.

King post pipes 20 are attached to king post 12 by guide 38. Guide 38 permits vertical movement of king post pipes 20 and limited lateral movement away from king post 12 as may be required in elevating or depressing the boom.

Supporting member 32 is connected by hinge or pin 31 to king post 12. Hydraulic cylinder 18 controls the angle of elevation of supporting member 32. Supporting member 32 is capable of being elevated to within several degrees, e.g., 5 to 10 degrees, of a vertical position and can be depressed about 10 degrees below a horizontal position. If the need for further elevation or depression warrants, a change in the location of hydraulic cylinder 18 can be made to accommodate the additional angles. Such a change would locate the hydraulic cylinder 18 within king post 12 or supporting member 32. In such an instance, pin 31 would be U-shaped to permit the hydraulic cylinder 18 to cross the pivoting center of pin 31 as would occur in a vertical or near vertical elevation of supporting member 32. Also, other means of elevating the supporting member 32 can be used such as a cable and pulley system operating from an extended king post 12.

Connected to the projecting end of supporting member 32 is forearm 54 which is controlled by a second hydraulic cylinder 44. The joint between supporting member 32 and forearm 54 is preferably a hinge to permit movement of forearm 54 at joint 42. Forearm 54 is capable of swinging to within an angle of about 30 degrees with supporting member 32 and extending to about 150 degrees away from supporting member 32. Again, hydraulic cylinder 44 can be relocated so that forearm 54 can be drawn to a 0 degree angle with supporting member 32. In being able to draw forearm 54 to within 10 degrees of supporting member 32, the boom can be conveniently folded for stowing when not in use. Forearm 54 is also capable of side movements ranging up to about 10 degrees displacement from a vertical plane passing through king post 12 and supporting member 32. This displacement is achieved by constructing supporting member 32 so as to withstand a 10 degree twist from the normal position.

The fluid conveying means are pipe assemblies which comprise king post pipes 20, supporting member pipes 34 and 35 and forearm pipes 52. King post pipes 20 are attached to feed pipes 22 by means of flange joints 23 and 27 and ball joints 24, 25 and 26. This combination of flange and ball joints provides means for vertical movement of king post pipes 20 and means for rotation about the vertical axis of king post 12 in a manner compensatory to the movements of king post 12. Alternately, the means permitting vertical and rotational movements in the king post pipe assembly is achieved by using flexible tubing to replace the section of piping between ball joint 24 and ball joint 26.

Linked to king post pipes 20 by means of swivel joints or rotary ball joints 28 and 29 are supporting member pipes 34 and 35. Supporting member pipes 34 and 35 are attached to supporting member 32 by attachments 36 and 37. These attachments normally hold pipes 34 and 35 in a substantially fixed position along supporting member 32 but may also serve as sleeves which permit movement of supporting member pipes along supporting member 32 in a direction substantially parallel to supporting member 32.

Attached to the terminal end or projecting end of supporting member pipes 34 and 35 is flexible tubing 40. Flexible tubing 40 comprises less than about 40 percent of supporting member pipe assembly and normally is used in an amount of 15 to 20 percent of said pipe assembly. Flexible tubing 40 is in turn swivelly attached by means of swivel 46 to forearm pipes 52. However, flexible tubing 40 can be completely eliminated and replaced with rigid piping by continuing pipes 34 and 35 to swivel 46. In this embodiment the flexibility supplied by tubing 40 is gained through connections 66 and 70.

Forearm pipes 52 are retained on forearm 54 by guiding means 48 and 50 which permit limited movement along forearm 54 in a direction substantially parallel to forearm 54.

Proceeding towards the extreme end of forearm pipes 52 are T-joints 56 and elbows 57. Flexible tubing 58 is connected through elbow 57 and T-joint 56 to forearm pipes 52, thereby positioning flexible tubing 58 substantially parallel to forearm pipes 52. Fluids being conveyed through piping 52 flow through T-joint 56 and elbow 57 into flexible tubing 58. Forearm pipe 52 continues to mechanical ball connection 66 where it is terminated. Mechanical ball connection 66 attaches to forearm connection plate 68. Therefore, the weight of forearm pipe 52 is not carried or imposed upon flexible tubing 58 but rather is supported by connection plate 68 and forearm 54. Forearm 54 connects to forearm connection plate 68 by means of ball connection 70. In this manner, forearm 54 sustains substantially all of the stresses and weight associated with the apparatus. Fluid connections from flexible tubing 58 are made by dual valves and flange or by snap valve and connecting flange 64 which attach the ball valves 60. Snap valve and connecting flange 64 are self-sealing and do not permit the flow or dripping of liquids when disconnected from ball valves 60. Fluid flow through the apparatus is through snap valve and connecting flange 64, ball valves 60 and hence to terminal lines 62.

Alternately, T-joint 56 can be eliminated and fluid flow continued through pipe 52 to connection 66. Connection 66 would then be attached to a section of flexible tubing which would connect by snap joint or connecting flange to the dock installation. Again, the boom would support the pipe assemblies to thereby relieve them of weight imposed stresses.

Flexible tubing 58 or the alternate flexible tubing employed with the forearm pipe assembly as described, is used in an amount less than about 40 percent of the total length of forearm pipe assembly and more preferably, it is used in an amount of 10 to 20 percent of said pipe assembly.

Upon completing connections between the boom and forearm pipe assemblies and forearm connection plate 68, it is desirable to relax the hydraulic boom cylinders 18 and 44 in addition to the hydraulic cylinder used to rotate king post 12. This relaxation can be performed by manual controls. However, it ils more desirable to accomplish the relaxation automatically through the use of microswitch means mounted on the forearm connection plate. Such microswitch means automatically relax the hydraulic cylinders on completion of the connection or at any other desired step in the connecting procedure. The microswitches are preferably connected to actuate electrical impulses which effect the relaxation during the connecting procedure. Also, to facilitate the proper mating of the various pipes and forearm ball connections with the forearm connection plate, means such as valve locators are conveniently used.

Optionally or in addition to the hydraulic control means, the use of manual direction controls for all of the functions of the boom can be provided.

In addition to the boom and pipe assemblies illustrated in the drawings, it is sometimes desirable to use vent lines or pressurizing lines connecting the containers between which fluids are being transferred. Such lines can also be located and supported by the boom in a manner similar to that illustrated.

Also, it is readily recognized that a number of pipe assemblies other than those specifically illustrated can be used. Thus, any plurality of pipes can be employed. For instance, two up to six or even more pipes can be supported by the present boom in addition to any vent lines which may be desired. An arrangement employing six pipes would be similar to the assemblies shown and described using four pipes with the additional two pipes situated substantially parallel to the other pipe assemblies and being located on the side of the boom between the illustrated pipes. Thus, the additional two pipes would be situated so as to follow the center line of the king post, supporting member and forearm, thereby forming pivoting points on a line which would pass through both the axes of the boom joints and the pipe joints. In a like manner, two pipes can be used as well as three, five and even seven or eight pipes.

As has been described, the present boom can employ pipe assemblies which eliminate flexible tubing at the king post and supporting member as is desirable when conveying exceptionally hazardous fluids.

On disclosure of the present invention, one skilled in the art will note that various modifications can be made on the present invention without departing from its scope and spirit. Modifications such as curving the supporting member or forearm to facilitate folding the boom in a stowing position can be made. Also, the pipes of supporting member assembly can be of equal length and thereby cross each other at their juncture with the forearm pipe assembly. Such an assembly would function in a parallelogram fashion in raising and lowering the boom. Various safety devices which limit the angles of motion so as not to accidentally create a stress on the boom or pipe assemblies can also be incorporated into the present invention. These and other like modifications are intended to be a part of the present invention.

The apparatus described is particularly useful for the conveyance of hazardous liquids under pressure. The limited use of flexible tubing permits corrosion resistant construction at a minimum expense without appreciable sacrifice in safe operating pressures or increased danger of rupture. The conveying system is constructed to permit easy replacement of fluid piping if the need should so arise.

As previously suggested, the present apparatus is primarily useful in the loading and unloading of ships, barges, tankers wherein its maneuverability and adaptability to changing positions due to changes in floatation are particularly desirable. However, other uses such as the loading of tank cars, tank wagons and the like can be made of the present apparatus.

While there have been described various embodiments of the invention, the apparatus described is not intended to be understood as limiting the scope of the invention, as it is realized that changes therein are possible. It is further intended that each element recited in any of the following claims is to be understood as referring to all equivalent elements for accomplishing substantially the same results in substantially the same or equivalent manner. It is intended to cover the invention broadly in whatever form its principles may be utilized.

What is claimed is:

1. An apparatus for transferring fluid between two containers comprising a boom comprised of a vertically mounted king post capable of rotation to which is associated, in operative relationship, a supporting member; said supporting member having associated thereto in operative relationship a forearm; said forearm having associated thereto in operative relationship a forearm supporting member; said king post having means for rotation, and said supporting member and said forearm having means for actuation; said boom having retained thereon a plurality of pipe assemblies comprising a king post pipe assembly, a supporting member pipe assembly, a forearm pipe assembly, and a forearm supporting member pipe assembly; said king post pipe assembly being maintained in operative relationship with said king post and supporting member movement; said king post pipe assembly being linked to the supporting member pipe assembly which is retained substantially parallel to said supporting member; said supporting member pipe assembly being comprised of rigid pipes having terminal sections of flexible tubing; said supporting member pipe assembly being linked to said forearm pipe assembly which is retained by said forearm substantially parallel thereto; said pipes of the forearm pipe assembly being T-joined to sections of flexible tubing; said flexible tubing being linked to the forearm supporting member pipe assembly being comprised of connecting flanges rigidly held by said forearm supporting member; said forearm pipe assembly being connected to and maintained in operational relationship with said forearm supporting member and providing auxiliary support for said flexible tubing; the king post, supporting member, forearm and forearm supporting member pipe assemblies being supported by said boom and being interconnected for fluid transmission.

2. The apparatus of claim 1 wherein means are provided for relaxing the rotation means and the actuation means.

3. An apparatus for transferring fluids between two containers comprising a boom comprised of a king post to which is associated in operative relationship a supporting member, said supporting member being associated in operative relationship with a forearm, said king post having means for rotation, and said supporting member and said forearm having means for actuation; said means for rotation and means for actuation being provided with a means for relaxation of said means for rotation and means for actuation; said boom having associated thereto a plurality of pipe assemblies comprising a king post pipe assembly, a supporting member pipe assembly and a forearm pipe assembly; said king post pipe assembly being maintained in operative relationship with said king post and being adapted for movement compensatory with the supporting member movement; said king post pipe assembly being linked to the supporting member pipe assembly retained by said supporting member, and said supporting member pipe assembly being linked to said forearm pipe assembly, the forearm pipe assembly being retained by the forearm, said forearm being connected to and adapted to be supported by a forearm supporting member; the king post, supporting member and forearm pipe assemblies being supported by said boom and being interconnected for fluid transmission.

4. The apparatus of claim 3 wherein the means for effecting the relaxation of said rotation means and actuation means are microswitches which are in operative connection with said means for rotation and means for actuation.

5. An apparatus for transferring fluids between two containers comprising a boom comprised of a vertically mounted king post capable of rotation to which is associated, in operative relationship, a supporting member; said supporting member having associated thereto in operative relationship a forearm; said king post having means for rotation, and said supporting member and said forearm having means for actuation; said means for rotation and means for actuation being provided with a means for relaxation of said means for rotation and means for actuation; said boom having retained thereon a plurality of pipe assemblies comprising a king post pipe assembly, a supporting member pipe assembly, and a forearm pipe assembly; said king post pipe assembly being maintained in operative relationship with said king post and being adapted for movement compensatory with rotation of the king post and supporting member movement; said king post pipe assembly being linked to the supporting member pipe assembly which is retained substantially parallel to said supporting member; said supporting member pipe assembly being comprised of rigid pipes having terminal sections of flexible tubing; said supporting member pipe assembly being linked to said forearm pipe assembly which is retained by said forearm substantially parallel thereto, said forearm being connected to and adapted to be supported by a forearm supporting member; said pipes of forearm assembly being T-joined to sections of flexible tubing; the king post, supporting member and forearm pipe assemblies being supported by said boom and being interconnected for fluid transmission.

6. The apparatus of claim 5 wherein the means for effecting relaxation of said rotation means and actuation means are microswitches which are in operative connection with said means for rotation and said means for actuation.

References Cited

UNITED STATES PATENTS

| 1,022,042 | 4/1912 | Muller | 222—533 |
| 1,680,831 | 8/1928 | White | 141—388 |
| 2,536,678 | 1/1951 | Coe | 137—101.19 |
| 3,085,593 | 4/1963 | Sorensen | 137—615 |
| 3,126,913 | 3/1964 | Green | 141—387 |
| 338,951 | 3/1886 | Graff | 212—57 |
| 2,922,446 | 1/1960 | Sheiry | 141—388 |

FOREIGN PATENTS 23,933   10/1962   Germany.

WILLIAM F. O'DEA, *Primary Examiner.*

H. COHN, *Assistant Examiner.*